(12) United States Patent
Soong et al.

(10) Patent No.: US 9,096,141 B2
(45) Date of Patent: Aug. 4, 2015

(54) DETACHABLE MODULARIZED BATTERY CHARGING ASSEMBLY

(75) Inventors: Tzu-Wen Soong, Taipei (TW); Hsun Hao Chieh, New Taipei (TW)

(73) Assignee: Go-Tech Energy Co. Ltd., New Taipei (TW)

(*) Notice: Subject to any disclaimer, the term of this patent is extended or adjusted under 35 U.S.C. 154(b) by 685 days.

(21) Appl. No.: 13/443,102

(22) Filed: Apr. 10, 2012

(65) Prior Publication Data

US 2013/0264996 A1 Oct. 10, 2013

(51) Int. Cl.
*H02J 7/00* (2006.01)
*B60L 11/18* (2006.01)

(52) U.S. Cl.
CPC ........... *B60L 11/1822* (2013.01); *H02J 7/0027* (2013.01); *Y02T 10/7005* (2013.01); *Y02T 10/7055* (2013.01); *Y02T 10/7072* (2013.01); *Y02T 90/124* (2013.01); *Y02T 90/14* (2013.01); *Y02T 90/16* (2013.01)

(58) Field of Classification Search
CPC .................................................. B60L 11/1822
USPC .......................................................... 320/113
See application file for complete search history.

(56) References Cited

U.S. PATENT DOCUMENTS

| | | | |
|---|---|---|---|
| 6,154,006 A | 11/2000 | Hatanaka et al. | |
| 6,218,796 B1 | 4/2001 | Kozlowski | |
| 2003/0141840 A1* | 7/2003 | Sanders | 320/107 |
| 2007/0188130 A1 | 8/2007 | Scheucher | |
| 2009/0039705 A1* | 2/2009 | Lyman et al. | 307/64 |
| 2012/0303397 A1* | 11/2012 | Prosser | 705/7.12 |
| 2013/0030608 A1* | 1/2013 | Taylor et al. | 701/2 |

FOREIGN PATENT DOCUMENTS

| | | |
|---|---|---|
| EP | 0693813 A1 | 1/1996 |
| EP | 2428939 A1 | 3/2012 |
| FR | 2780569 A1 | 12/1999 |
| GB | 2428525 A | 1/2007 |
| TW | 439343 | 6/2001 |
| WO | 99/57794 A1 | 11/1999 |

OTHER PUBLICATIONS

European Search Report in corresponding European Patent Application No. EP 12 16 3567, dated Jan. 3, 2013.
Office action issued by Taiwanese patent office on Dec. 2, 2014, for the US counterpart case.

* cited by examiner

*Primary Examiner* — Richard Isla Rodas
*Assistant Examiner* — David V Henze-Gongola
(74) *Attorney, Agent, or Firm* — Che-Yang Chen; Law Office of Michael Chen (57) ABSTRACT

A detachable modulized battery charging assembly for electric vehicles is disclosed. The detachable modulized battery charging assembly includes a number of charging units for charging rechargeable batteries of electric vehicles while the rechargeable batteries are detachably inserted therein; a managing unit for controlling the charging units, recording charging statuses of the rechargeable batteries, and confirming identification of a user; and a user interface unit for communicating with the user. The charging units, the managing unit and the user interface unit are modulized and can be fixed together in different arrangements.

16 Claims, 7 Drawing Sheets

DETACHABLE MODULARIZED BATTERY CHARGING ASSEMBLY

FIELD OF THE INVENTION

The present invention relates to a battery charging assembly. More particularly, the present invention relates to a detachable modularized battery charging assembly for charging batteries of electric vehicles.

BACKGROUND OF THE INVENTION

An electric vehicle, also referred to as an electric drive vehicle, is a moving vehicle using one or more electric motors as driving system. Unlike petroleum-based transportations which are moved by the energy from gasoline, the electric vehicles use electric power as their propulsion. They won't generate waste gas. Noise is also less. During the last few decades, increased concern over the environmental impact of the petroleum-based transportation, along with the spectre of peak oil, has led to renewed interest in electric transportation. Electric power for electric vehicles can be generated from a wide range of sources, including fossil fuels, nuclear power, and renewable sources such as tidal power, solar power, and wind or any combination of those.

In the past, an electric vehicle consumes huge electric power due to their power system. The electric power can only be transmitted to the car through overhead lines. This infrastructure makes the electric vehicles impossible to be popular. Only some of public transportations have access to it. Routes of the public transportation are strictly limited by the lined arrangement. With the development in power systems of electric vehicles, especially in batteries, the electric vehicles become a future star and more and more sources are devoted in this field.

People are used to their existing life experience. Hence, a system for charging the batteries of the electric vehicles should be as convenient as a gas station system. When batteries of an electric car are in low battery, people can drive the car to a nearby charging station and get the batteries charged or replaced with full charged ones. Preferably, the batteries can be charged during off-peak period when cost of charge of electricity is lowest. Meanwhile, with a device to manage batteries that are used in the car, people can always know the status of the batteries and mechanics of the stations can trace the batteries for maintenance. Since the batteries are expensive, if the batteries are stolen and they can be easily found, it will be a great help for the car owners. However, the requirements mentioned above need an integrated system to fulfill.

To fulfill the requirements, a charging station that can provide battery exchange service which allows a user to exchange a low power battery for a fully charged battery to save waiting time is desperately needed. However, to successfully manage such a battery exchange service also needs to have corresponding hardware systems to carry out such goal.

Traditional charging station, as disclosed in U.S. Pub. No. 2010/0013434 and 2012/0022685, mainly provides a charging booth for an electric vehicle to physically connect to, such as a gasoline station. However, for a battery in low power to be fully charged may take hours, and drivers might not have that time and patience.

Figure 1:
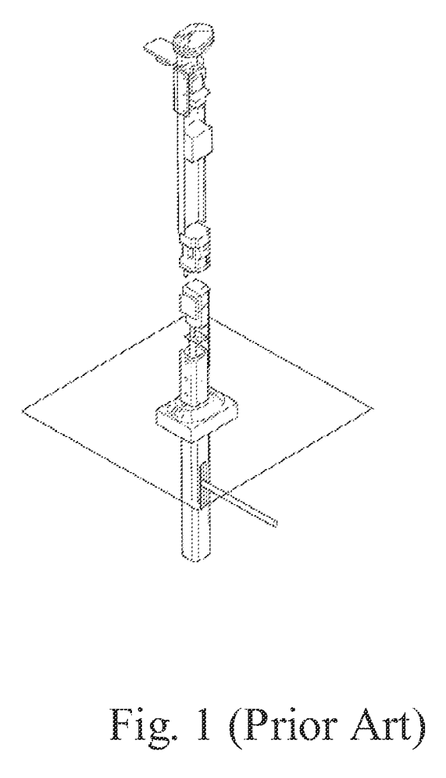
FIG. 1 shows a prior art of a charging system.

Please refer to FIG. 1. U.S. Pub. No. 2010/0013434 provides a charging station operable in a charging cycle for charging an electric vehicle. The charging station has a key-activated controller for controlling the charging cycle. The application also relates to a key for operating the charging station. Furthermore, the application relates to a charging station having an interface for connecting the charging station to a data network. The application also relates to a charging station having a socket for receiving a plug and a key-operated locking mechanism for locking a plug in said socket. A frangible panel movable between an open position and a closed position may be provided. A processor may be provided for generating data to impose a financial charge on an individual for using the charging station. However, it still cannot fulfill the aforementioned requirements.

Figure 2:
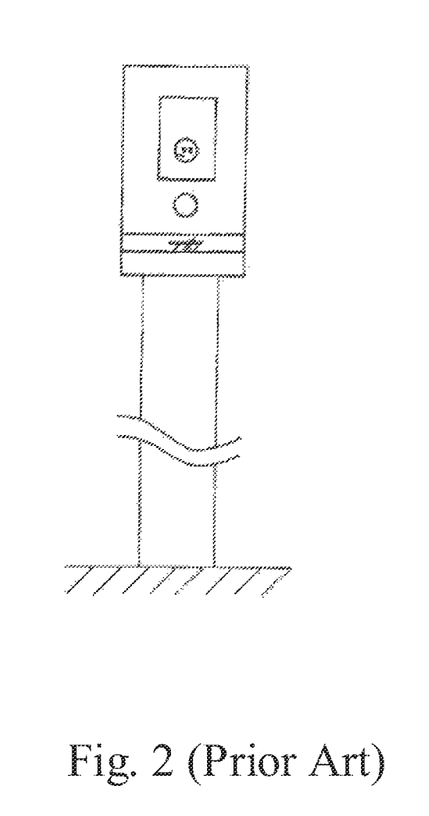
FIG. 2 shows another prior art of a charging system.

Please refer to FIG. 2. U.S. Pub. No. 2012/0022685 discloses a method for operating an electric charging station within a parking area proposes operating an electric charging station within a parking area. An identification device is used by a user when entering into the parking area, wherein the identification device provides a unique identification, wherein a current supply device of the charging station is activated by the user by using the identification device whereupon the current supply device is available for a charging process. However, it fails to fulfill the aforementioned requirements.

Hence, a solution to fulfill the above mentioned requirements for electric vehicle battery charging is desperately desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a detachable modularized battery charging assembly includes: a plurality of charging units, for charging a plurality of rechargeable batteries of electric vehicles while the rechargeable batteries are detachably inserted therein; a managing unit, connected to each of the charging units, for controlling the charging units, recording charging statuses of the rechargeable batteries, and confirming identification of a user; and a user interface unit, connected to the managing unit, for communicating with the user. The charging units, the managing unit and the user interface unit are modularized and can be fixed together in different arrangements.

Preferably, the user interface unit indicates which rechargeable battery is fully charged for the user to use.

Preferably, each of the charging units comprises a processor for retrieving data from the rechargeable battery.

Preferably, each of the charging units comprises an engaging element for engaging the rechargeable battery with the charging unit until an unlock instruction is received from the managing unit.

Preferably, the user interface unit comprises a monitor or a touch panel.

Preferably, the managing unit comprises a computer.

Preferably, the charging units, the managing unit and the user interface unit are individually formed in a rectangular cuboid shaped housing and can be stacked vertically and horizontally together to form an array of m×n, and m and n are integers.

Preferably, the managing unit and the user interface unit are together formed in a first housing having a rectangular cuboid shape and can be stacked vertically and horizontally with the charging units which are individually formed in a second housing having a rectangular cuboid shape to form an array of m×n, and m and n are integers.

Preferably, the detachable modularized battery charging assembly further includes a rack for accommodating the charging units, the managing unit and the user interface unit.

Preferably, the rack is divided into m×n sections, and m and n are integers.

Preferably, the charging units are individually placed in one of the sections.

Preferably, the managing unit and the user interface unit are placed in the same section together.

Preferably, the managing unit and the user interface unit are separately placed in two different sections.

Preferably, multiple adjacent sections are combined into one region for accommodation of the managing unit and the user interface unit.

Preferably, multiple adjacent sections are combined into one region for accommodation of multiple charging units.

Preferably, multiple adjacent sections are combined into one region for accommodation of another charging unit having a size multiple of the size of the plurality of charging units.

Preferably, the charging units have the same size.

DETAILED DESCRIPTION OF THE PREFERRED EMBODIMENTS

The present invention will now be described more specifically with reference to the following embodiments.

First Embodiment

Figure 3:
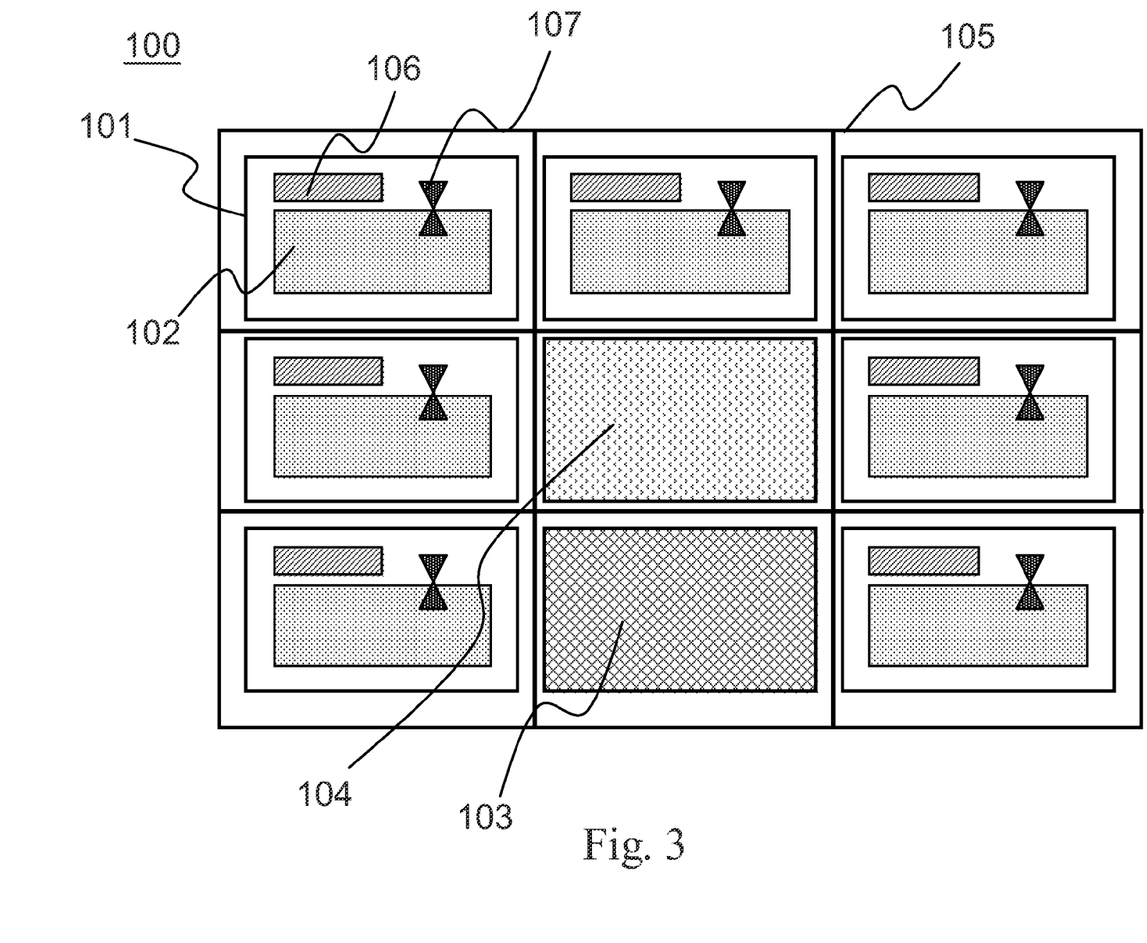
FIG. 3 illustrates a schematic diagram of a first embodiment of the present invention.
Figure 4:
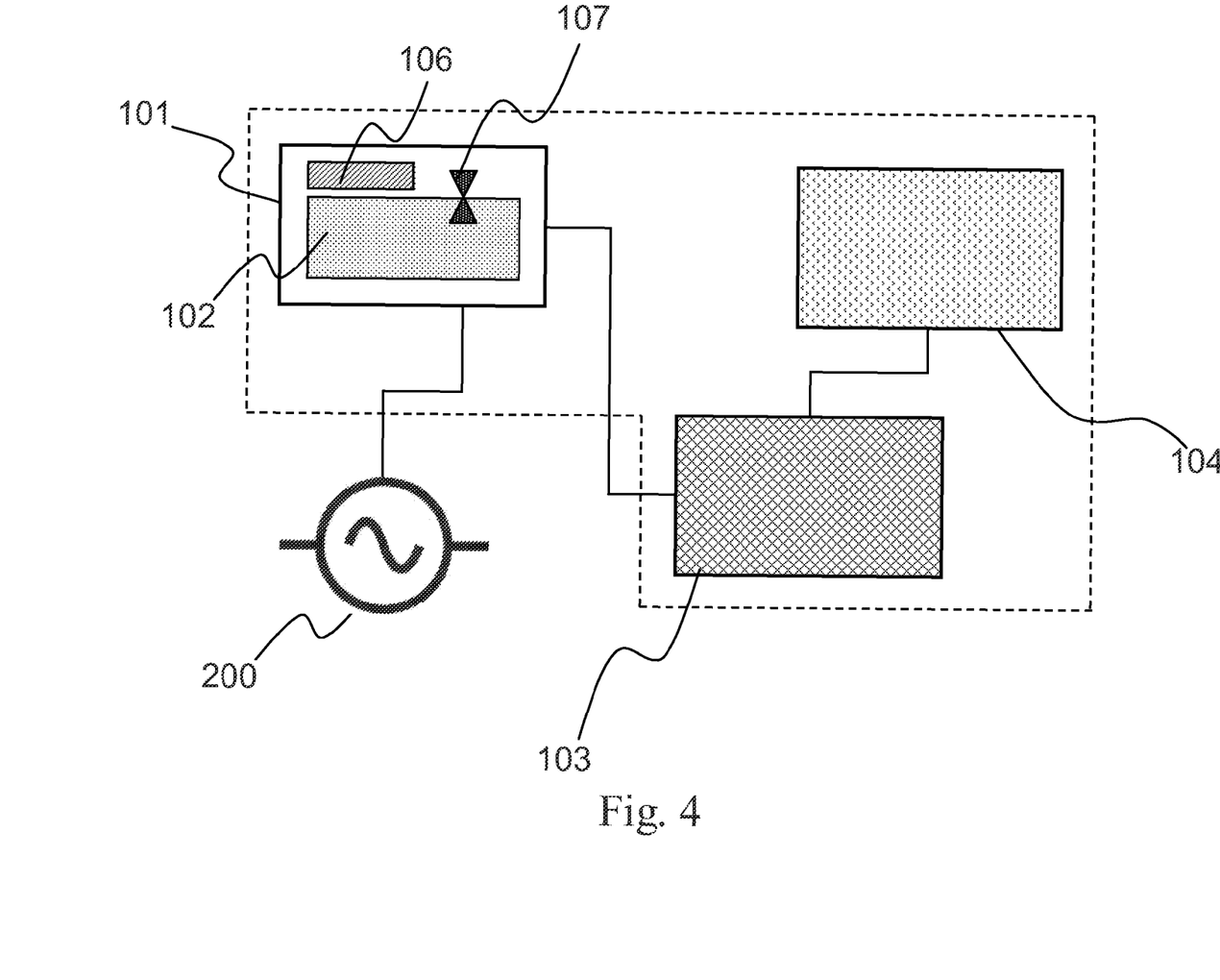
FIG. 4 illustrates another schematic diagram of the first embodiment of the present invention.

Please refer to FIG. 3 and FIG. 4. A first embodiment is described. FIG. 3 is a schematic diagram of a detachable modularized battery charging assembly 100. In this embodiment, the detachable modularized battery charging assembly 100 includes seven charging units 101, a managing unit 103, a user interface unit 104 and a rack 105. Each of the charging unit 101 has a processor 106 and an engaging element 107. FIG. 4 shows how the detachable modularized battery charging assembly 100 works.

Please refer to FIG. 4 first. Dash-lined enclosed elements illustrate a basic charging unit of the detachable modularized battery charging assembly 100. Each of the charging units 101 has the same size. Therefore, the charging units 101 can be modularized. A rechargeable battery 102 of an electric vehicle (not shown) can be charged by removing it from the electric vehicle and then inserting it into one of the charging units 101.

As aforementioned, the charging unit 101 has a processor 106 and an engaging element 107. The processor 106 is used for retrieving data from the rechargeable battery 102. The data may include battery information and/or user identification. The battery information includes charging state, lifetime, cycle count, health state and/or serial number of the rechargeable battery. The user identification may include user name, user telephone number, user ID number, license plate number of the electric vehicle, and/or user password. The battery information and user identification of each rechargeable battery are stored in a database in the managing unit 103 or a remote server. By this way, rechargeable batteries can be easily traced while lost or stolen, and can provide a better battery management. For example, a user can be notified in advance while a rechargeable battery needs to be renewed due to depletion of lifetime or defect of a battery. Once a rechargeable battery 102 is inserted into the charging unit 101, the processor 106 can retrieve data from the rechargeable battery 102 and then provide the data to the managing unit 103 for further identification. For example, the managing unit 103 can identify whether the rechargeable battery 102 belongs to the user by such data retrieved from the rechargeable battery 102 because the data either includes user identification or battery information. If the data only includes battery information such as serial number but does not include user identification, then user identification can still be obtained by matching the serial number of the rechargeable battery 102 with database in the managing unit 103 or with database in a remote server. After the low powered rechargeable battery is exchanged with a fully charged rechargeable battery, the possessor of the low powered rechargeable battery will no longer be recorded as the user in the database, whereas the user will instead be recorded as the possessor of the fully charged rechargeable battery in the database.

The engaging element 107 engages the rechargeable battery 102 with the charging unit 101 until an unlock instruction is received from the managing unit 103. The function of unlock instruction protects the rechargeable battery 102 from being taken without permission. Only when the rechargeable battery 102 is fully charged and identification of the user is approved, i.e., it is confirmed that the low powered rechargeable battery 102 for exchange belongs to the user, the unlock instruction is given.

The charging unit 101 is electrically linked to an external power source 200. The external power source 200 provides power to the charging unit 101 for the rechargeable battery 102 to be charged. The external power source 200 is not limited to be AC power, it DC power can also be used. In practice, it can also be a large power storage which has sufficient power stored to provide the charging unit 101.

Although only one charging unit 101 is shown in FIG. 4 for succinct explanation, the managing unit 103 is actually connected to each of the charging units 101. The managing unit 103 controls the charging units 101, records charging statuses of the rechargeable batteries 102, and confirms identification of a user of the rechargeable batteries 102. If a rechargeable battery 102 is out of order or the user identification is not approved, the managing unit 103 will instruct the charging unit 101 not to charge the rechargeable battery 102 therein. Ideally, the managing unit 103 includes a billing system such that a user can exchange a low powered rechargeable battery for a fully charged rechargeable battery after payments are paid. Basically, a computer can play the role of the managing unit 103.

The user interface unit 104 is connected to the managing unit 103. The user interface unit 104 is mainly used to communicate with the user. In the present invention, the user interface unit 104 is a monitor. It can also be a touch panel if a two-way communication for the detachable modularized battery charging assembly 100 and users are required.

When the detachable modularized battery charging assembly 100 has seven rechargeable batteries 102 in seven charging units 101 as shown in FIG. 3, not every fully charged rechargeable batteries 102 are allowed for the user to take, only the one that is decided by the managing unit 103 that is unlocked and able for the user to take. In other words, the user doesn't pick among the fully charged rechargeable batteries 102, the selection is made by the managing unit 103. After the selection is made by the managing unit 103, different methods can be used to indicate which of the rechargeable battery 102 is fully charged and selected for the user to take in exchange of a low powered rechargeable battery. For example, indication can be directly shown on the user interface unit 104 or simply by blinking lights set on the charging units 101 or rechargeable batteries 102.

The rack 105 is used for accommodating the charging units 101, the managing unit 103 and the user interface unit 104. In the present invention, the rack 105 may have m columns and n rows forming shelf-like sections, wherein m and n are integers. In the present embodiment, both m and n are 3 which form nine sections. The number of the column and row are not limited to 3. It can have 5 columns with 4 rows . . . etc. It should be note that the rack 105 is not limited to be a symmetric rectangular of m columns and n rows, it can even have (m×n)+1 sections or (m×n)+2 sections, and so on.

The key spirit of the present invention is to make the detachable modularized battery charging assembly 100 to be able to assemble like systematic furniture such that the charging units 101, the managing unit 103 and the user interface unit 104 can be fixed together in the rack 106 in different arrangements according to different needs by having the charging units 101, the managing unit 103 and the user interface unit 104 modularized. It should be noticed that the user interface unit 104 is not limited to be installed in the center of the sections. It can be put in any section of the detachable modularized battery charging assembly 100. As well, the charging units 101 and the managing unit 103 can be arranged freely in the sections. Although in FIG. 3, the managing unit 103 and the user interface unit 104 are placed separately in two different sections, they can also be placed in the same section.

By providing rechargeable battery exchange service, users don't need to wait for the batteries to be charged which sufficiently reduces the parking time of each vehicle, and therefore, the charging station dose not need to have a huge land to provide enough parking spaces for electric vehicles or cafeteria for users to stay while waiting. Hence, charging stations can also be in highly populated cities and not be limited to suburbs. Maintenance or replacement can also be easily performed since each component is modularized. It is also easier and cheaper for modularized components to be manufactured. Furthermore, assembly and disassembly can be much easier and convenient during shipping. Future addition of extra components can even be performed easily if needed.

Second Embodiment

Figure 5:
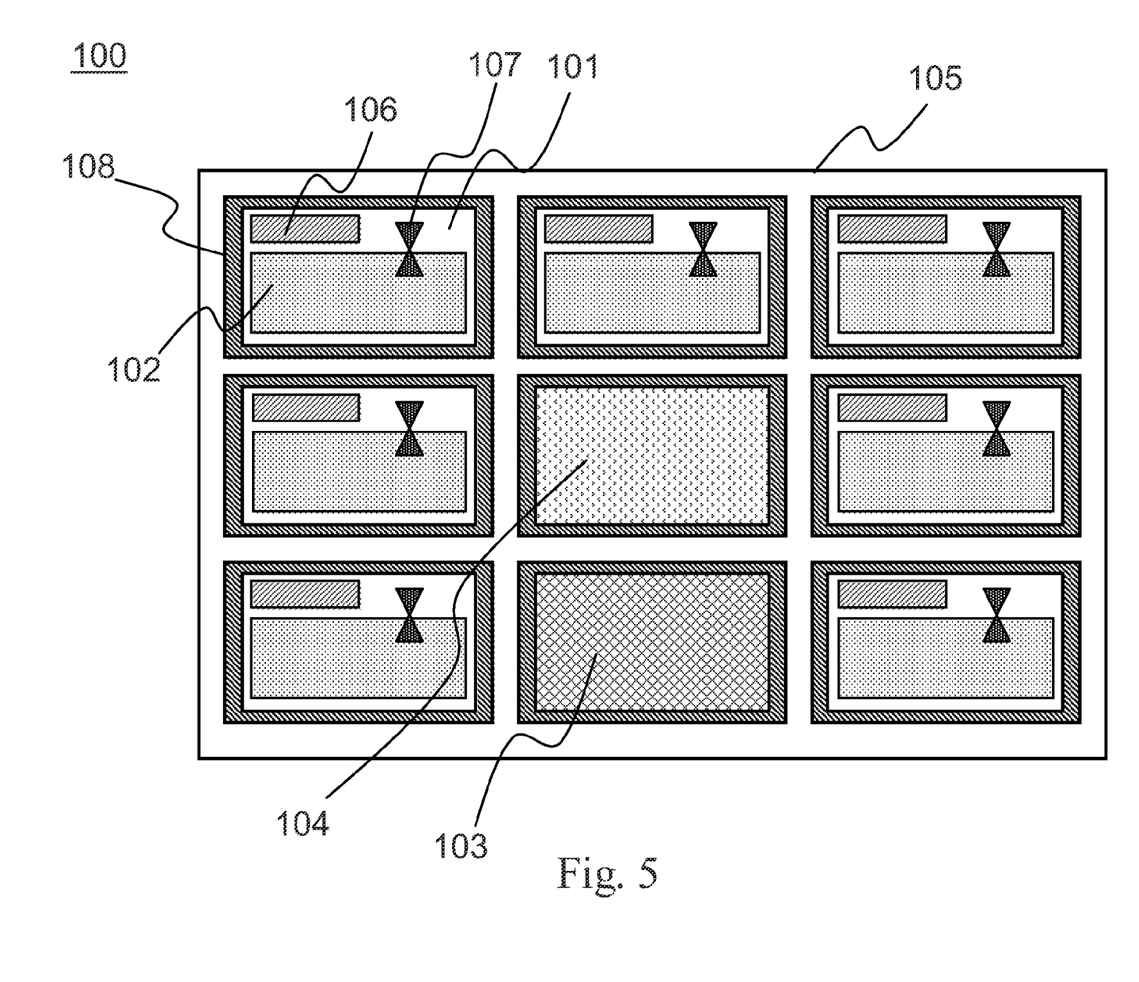
FIG. 5 illustrates a schematic diagram of a second embodiment of the present invention.

According to the spirit of the present invention, the elements of detachable modularized battery charging assembly 100 can also be further modularized in housings. Please refer to FIG. 5. It illustrates a second embodiment. In order to have an easy understanding, members having like functions will be identified by same reference numerals as that of the first embodiment and overlapping descriptions will be omitted. Differentiated from the first embodiment, a rack 105 is not divided into shelf-like sections, and the detachable modularized battery charging assembly 100 further includes a first housing 108. The charging units 101, the managing unit 103 and the user interface unit 104 are individually formed inside the first housing 108 having a rectangular cuboid shape and can be stacked vertically and horizontally together to form an array of m×n. Here, m and n are integers. As shown in FIG. 5, m equals to 3 and n also equals to 3. However, it should be noted that the detachable modularized battery charging assembly 100 is not limited to be a symmetric rectangular which has an array of m×n, it can be of any shape since the first housing 108 allows each unit to be able to stack or assemble together as building blocks.

Like the first embodiment, seven charging units 101, one managing unit 103 and one user interface unit 104 can be included in the rack 105. However, it should be noted that the rack 105 is not a requirement in this embodiment since each unit has a first housing 108.

Third Embodiment

Figure 6:
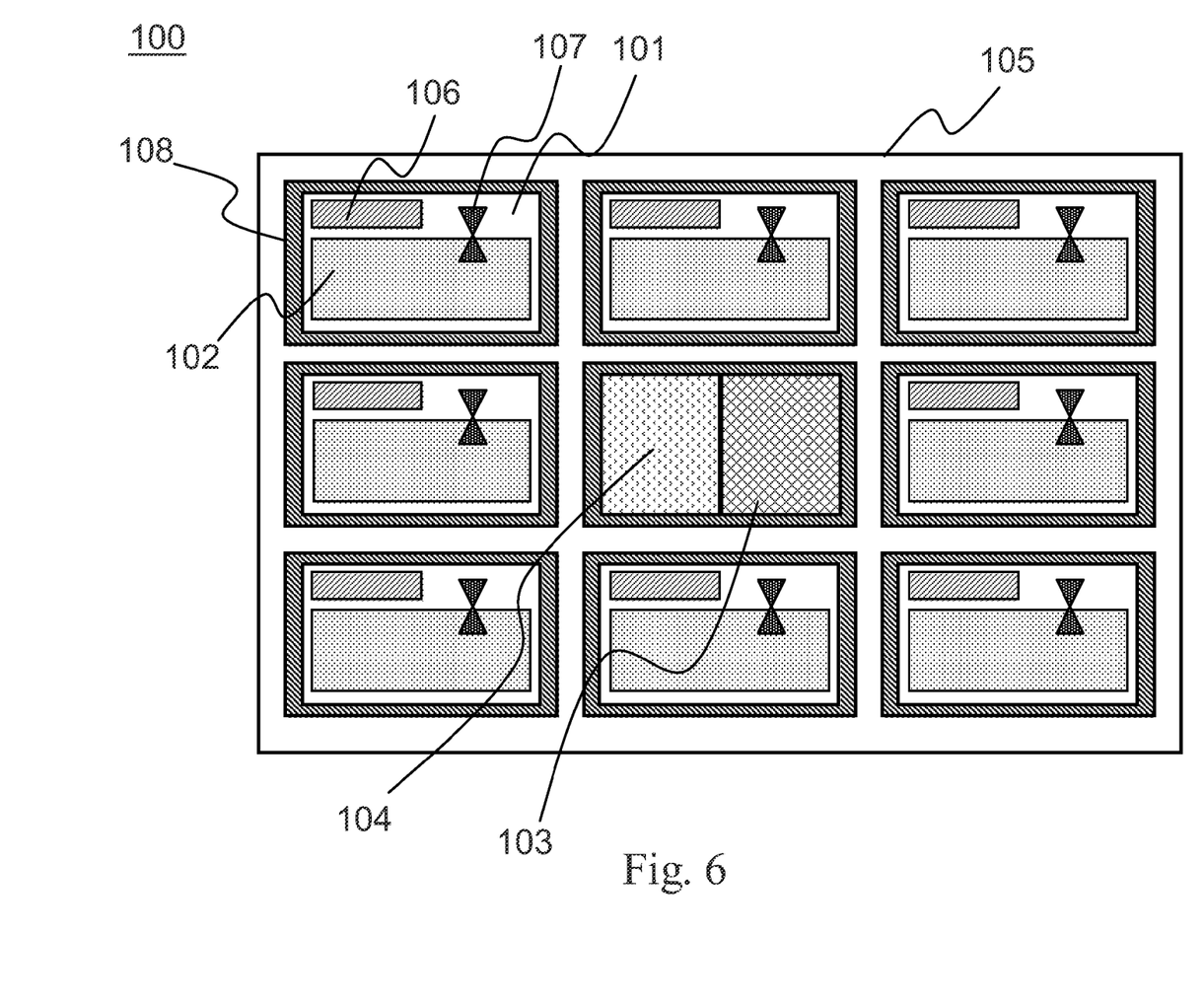
FIG. 6 illustrates a schematic diagram of a third embodiment of the present invention.

Please refer to FIG. 6. It illustrates a third embodiment. Members having like functions will be identified by same reference numerals as that of the first and second embodiments and overlapping descriptions will be omitted. Differentiated from the second embodiment, the managing unit 103 and the user interface unit 104 are together formed in the same housing which has a rectangular cuboid shape. In this embodiment, the size of the housing 108 for accommodation of the managing unit 103 and the user interface unit 104 is the same as that of for the charging units 102, and therefore, eight charging units 102 can be placed in the rack 105 to form an array of 3×3.

Fourth Embodiment

Figure 7:
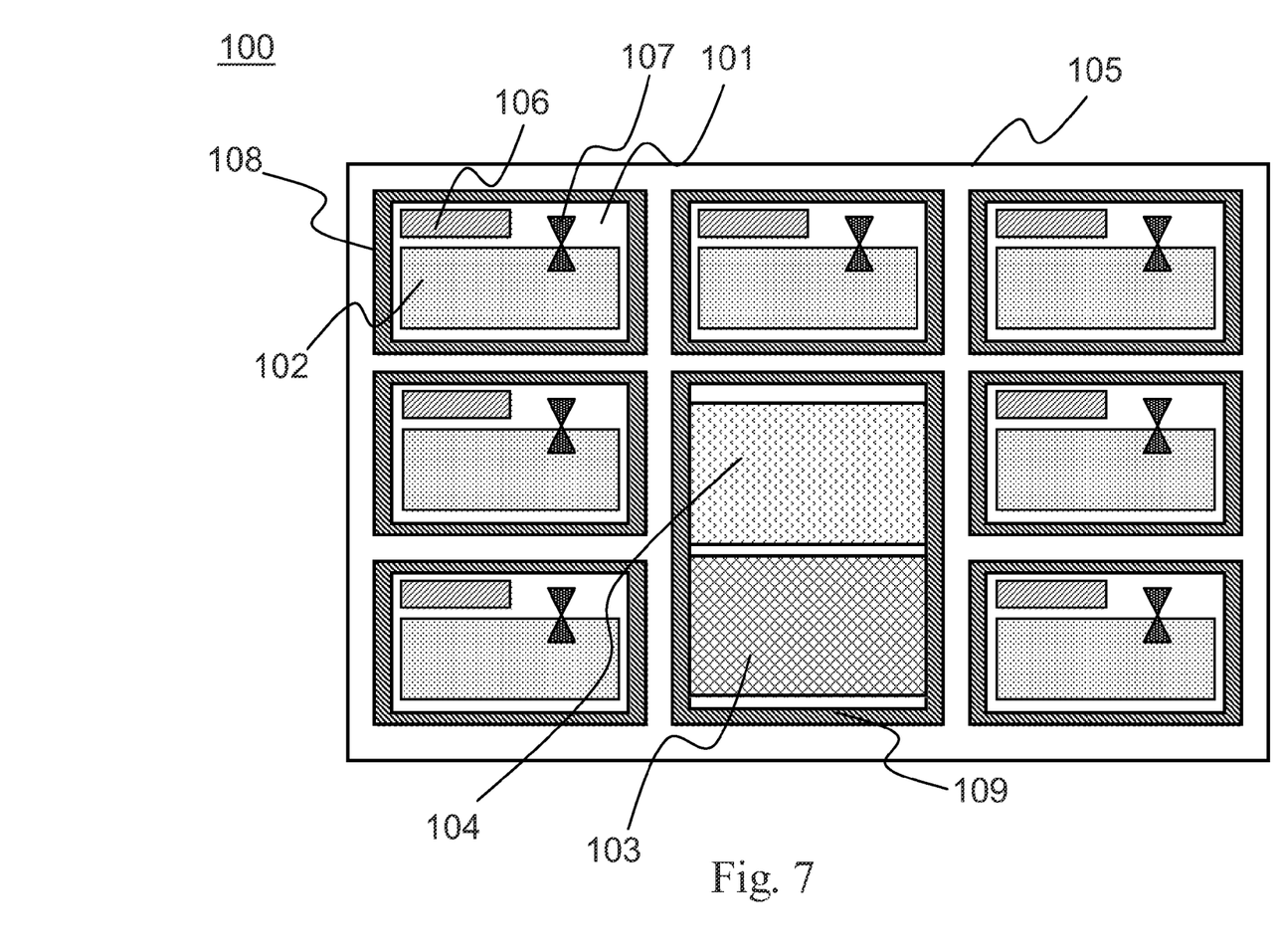
FIG. 7 illustrates a schematic diagram of a fourth embodiment of the present invention.

Please refer to FIG. 7. It illustrates a fourth embodiment. Members having like functions will be identified by same reference numerals as that of the previous embodiments and overlapping descriptions will be omitted. Differentiated from the third embodiment, the managing unit 103 and the user interface unit 104 are together formed in a second housing 109 which has a size double of the size of the first housing 108 accommodating the charging units 102. It should be noted that the second housing 109 is not limited to have a size double of the size of the first housing 108, the second housing 109 can have a size multiple of the size of the first housing 108. Meaning that multiple adjacent sections can be combined into one region to accommodate the managing unit 103 and the user interface unit 104. Thus, the second housing 109 can even occupy the size of 2×2 sections.

Similarly, multiple adjacent sections which are combined into one region can also be used for accommodation of multiple charging units or another charging unit having a size multiple of the size of the charging units 102.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A detachable modularized battery charging assembly, comprising:
a plurality of charging units, for charging a plurality of rechargeable batteries of electric vehicles while the rechargeable batteries are detachably inserted therein;

a managing unit, connected to each of the charging units, for controlling the charging units, recording charging statuses of the rechargeable batteries, and confirming identification of a user; and a user interface unit, connected to the managing unit, for communicating with the user;

wherein the charging units, the managing unit and the user interface unit are modularized and are individually formed in rectangular cuboid shaped housings that are detachably stacked vertically and horizontally together to form an array of m×n of different arrangements, and m and n are integers.

2. The detachable modularized battery charging assembly according to claim 1, wherein the user interface unit indicates which rechargeable battery is fully charged for the user to use.

3. The detachable modularized battery charging assembly according to claim 1, wherein each of the charging units comprises a processor for retrieving data from the rechargeable battery.

4. The detachable modularized battery charging assembly according to claim 1, wherein each of the charging units comprises an engaging element for engaging the rechargeable battery with the charging unit until an unlock instruction is received from the managing unit.

5. The detachable modularized battery charging assembly according to claim 1, wherein the user interface unit comprises a monitor or a touch panel.

6. The detachable modularized battery charging assembly according to claim 1, wherein the managing unit comprises a computer.

7. The detachable modularized battery charging assembly according to claim 1, wherein the managing unit and the user interface unit are together formed in a first housing having a rectangular cuboid shape and can be stacked vertically and horizontally with the charging units which are individually formed in a second housing having a rectangular cuboid shape to form an array of m×n, and m and n are integers.

8. The detachable modularized battery charging assembly according to claim 1, further comprising a rack for accommodating the charging units, the managing unit and the user interface unit.

9. The detachable modularized battery charging assembly according to claim 8, wherein the rack is divided into m×n sections, and m and n are integers.

10. The detachable modularized battery charging assembly according to claim 9, wherein the charging units are individually placed in one of the sections.

11. The detachable modularized battery charging assembly according to claim 9, wherein the managing unit and the user interface unit are placed in the same section together.

12. The detachable modularized battery charging assembly according to claim 9, wherein the managing unit and the user interface unit are separately placed in two different sections.

13. The detachable modularized battery charging assembly according to claim 9, wherein multiple adjacent sections are combined into one region for accommodation of the managing unit and the user interface unit.

14. The detachable modularized battery charging assembly according to claim 9, wherein multiple adjacent sections are combined into one region for accommodation of multiple charging units.

15. The detachable modularized battery charging assembly according to claim 9, wherein multiple adjacent sections are combined into one region for accommodation of another charging unit having a size multiple of the size of the plurality of charging units.

16. The detachable modularized battery charging assembly according to claim 1, wherein the plurality of charging units have the same size.

* * * * *